(12) United States Patent
Stephansen

(10) Patent No.: US 9,126,863 B2
(45) Date of Patent: Sep. 8, 2015

(54) METHOD FOR TEMPERATURE CONTROL IN A SLAKER

(75) Inventor: Poju R. Stephansen, Borgen (NO)

(73) Assignee: Poju R. Stephansen AS, Borgen (NO)

( * ) Notice: Subject to any disclaimer, the term of this patent is extended or adjusted under 35 U.S.C. 154(b) by 324 days.

(21) Appl. No.: 13/643,939

(22) PCT Filed: Apr. 28, 2011

(86) PCT No.: PCT/NO2011/000139
§ 371 (c)(1),
(2), (4) Date: Jan. 31, 2013

(87) PCT Pub. No.: WO2011/136658
PCT Pub. Date: Nov. 3, 2011

(65) Prior Publication Data
US 2013/0129606 A1    May 23, 2013

(30) Foreign Application Priority Data
Apr. 28, 2010  (NO) .................................. 20100611

(51) Int. Cl.
*C04B 2/04* (2006.01)
*C04B 2/08* (2006.01)

(52) U.S. Cl.
CPC .... *C04B 2/04* (2013.01); *C04B 2/08* (2013.01)

(58) Field of Classification Search
CPC .................................. C04B 2/04; C04B 2/08
USPC ........................................................ 423/640
See application file for complete search history.

(56) References Cited

U.S. PATENT DOCUMENTS

| 3,630,504 | A | * | 12/1971 | Reynolds ....................... 423/175 |
|---|---|---|---|---|
| 4,636,379 | A | * | 1/1987 | Bestek et al. .................. 423/640 |
| 4,741,896 | A | * | 5/1988 | Thomas, Sr. .................. 423/640 |
| 4,997,357 | A | * | 3/1991 | Eirich et al. ................... 425/144 |
| 5,223,239 | A | * | 6/1993 | Moran et al. .................. 423/640 |
| 5,492,685 | A | * | 2/1996 | Moran et al. ............... 423/244.07 |
| 5,558,850 | A | * | 9/1996 | Bleakley et al. .............. 423/432 |
| 5,746,983 | A |   | 5/1998 | Stephansen |
| 5,876,689 | A | * | 3/1999 | Webeling et al. ............. 423/640 |
| 5,965,103 | A | * | 10/1999 | Golley et al. .................. 423/640 |
| 6,245,315 | B1 | * | 6/2001 | Banerjee et al. ............. 423/640 |
| 6,270,631 | B1 | * | 8/2001 | Anthony .................. 204/157.42 |
| 6,790,424 | B2 | * | 9/2004 | Jasra et al. .................... 423/274 |
| 7,105,146 | B2 |   | 9/2006 | Hassibi |
| 7,744,678 | B2 | * | 6/2010 | Laudet et al. .................... 95/137 |
| 7,771,682 | B2 | * | 8/2010 | Ghosh et al. .................. 423/160 |
| 8,153,088 | B2 |   | 4/2012 | Stephansen |
| 2006/0093536 | A1 |   | 5/2006 | Selby |

FOREIGN PATENT DOCUMENTS

| CA | 1212825 | 10/1986 |
|---|---|---|
| WO | WO 2008123778 | 10/2008 |

OTHER PUBLICATIONS

International Search Report and Written Opinion, dated Aug. 16, 2011, issued in corresponding International Application No. PCT/NO2011/000139.

* cited by examiner

*Primary Examiner* — Anthony J Zimmer
(74) *Attorney, Agent, or Firm* — Klarquist Sparkman, LLP

(57) ABSTRACT

Method for batch wise slaking of burnt lime in a slaker, in which a lime slurry is produced with a great degree of fineness and long sedimentation time, comprising the following steps: the regulation of the slaking temperature is carried out in either of two steps—at incoming water temperatures between 0-10° C. a predetermined amount of the finished slurry is emptied out—at incoming water temperatures between 10-20° C. a predetermined amount of flushing water or diluting water is added.

5 Claims, 1 Drawing Sheet

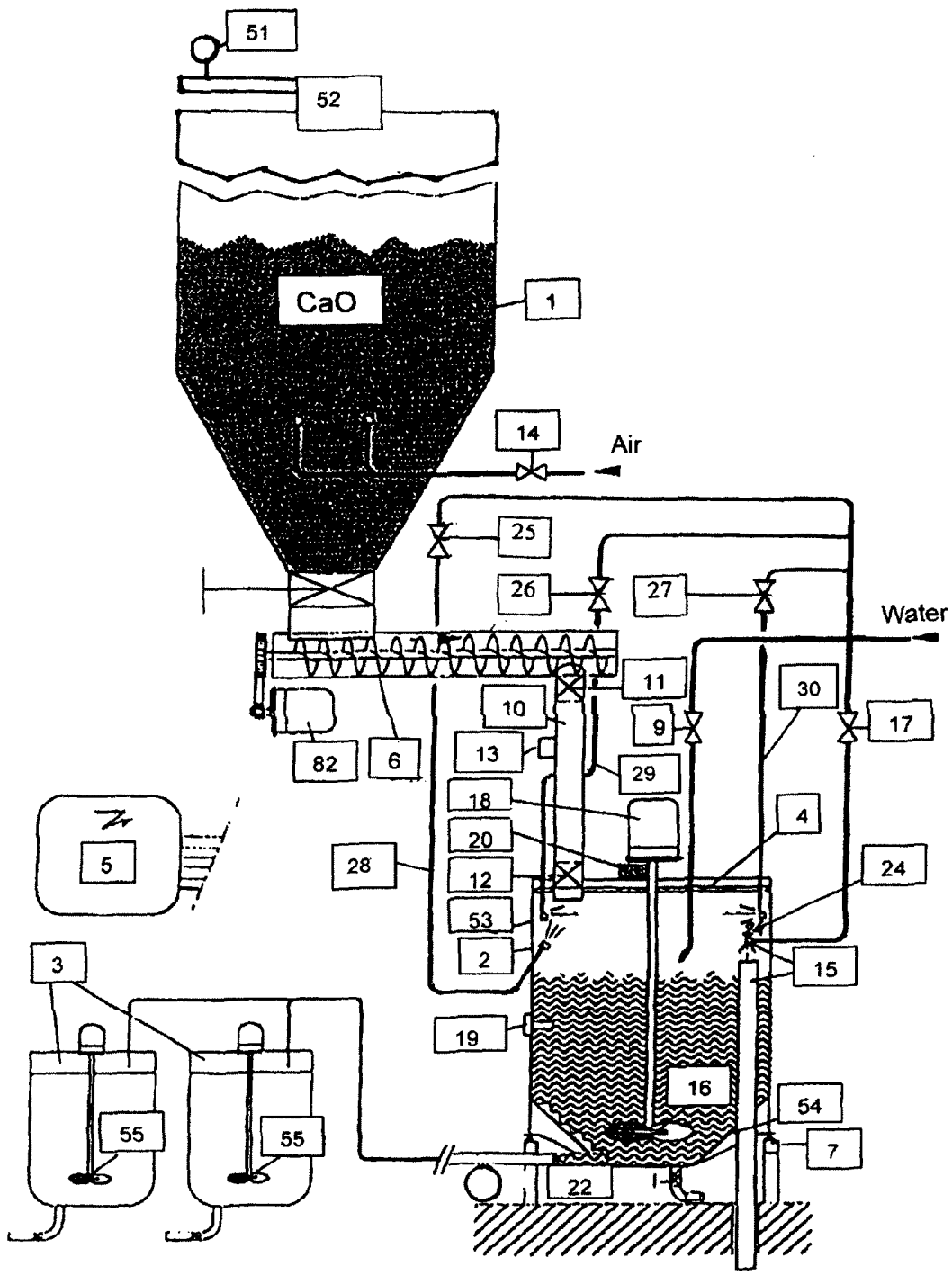

METHOD FOR TEMPERATURE CONTROL IN A SLAKER

The present invention relates to a method for temperature control for batchwise slaking of burnt lime in a slaker, in which a lime slurry is produced with a greater degree of fineness and prolonged sedimentation time, as given in the introduction in the independent claim 1.

Lime slakers of different types, where most of them are intended for continuous operation, have been applied industrially for some time. "W+T" and "BJF" slakers can be referred to as examples.

U.S. Pat. No. 4,547,349 relates to a device for non-batchwise, continuous slaking of lime. In UK patent application GB 2048107A, a lime slaker is shown and described, also for non-batchwise continuous operation. EP patent application 0510675A3 relates to a lime slaker for non-batchwise continuous operation. CA patent application 1212825 relates to a regulated process for batchwise production of slaked lime.

Furthermore, U.S. Pat. No. 7,105,146 B2 shows a method for batchwise slaking of lime which includes a flushing step before the subsequent slaking.

Lime slakers that are operated continuously have in common that they are difficult to control, very maintenance demanding, not suited to computer controlled operation and costly to manufacture.

In NO patent application 19933084, previously submitted by the present applicant P R Stephansen, a method is described for batchwise slaking, so-called "batch slaking" of burnt lime, also in relatively small amounts in relation to the volume of the slaker, whereupon a final product with relatively low lime concentration is obtained.

The content of the present application is a further development of NO 319297 and NO 327528, previously submitted patent applications NO 19980435, and NO 20070890 by the present applicant P R Stephansen, and which are hereby incorporated by reference.

During operation of a lime slaker, impurities and dust can lead to build-up of limestone which influences the slaking and can lead to blowouts at high temperatures. It is an object of the present invention to provide a new method for regulating the temperature, particularly in connection with variable water temperatures into the slaker which prevents the build-up of limestone and the disadvantages this leads to.

A closed system is provided which does not produce dust, and due to the immediate cleaning and temperature regulation an installation is provided with, at least, considerably reduced maintenance because of the reduction of the build-up of limestone.

The present invention is characterised by the characteristic part of claim 1, in that the regulation of the slaking temperature is carried out in at least two phases dependent on the temperature of the inlet water, in which:

at water temperatures between 0-10° C. the temperature is regulated in that a predetermined amount more of the finished slurry is emptied out if a lower temperature limit has not been reached, and if the temperature during slaking goes above an upper temperature limit a predetermined amount smaller of the finished slurry is emptied out, and at water temperatures between 10-20° C. the temperature is regulated in that more of a predetermined amount of flushing water or diluting water is added if a lower temperature limit is not reached, and if the temperature during slaking goes above an upper temperature limit less of a predetermined amount of flushing water or diluting water is added.

Alternative preferred embodiments of the invention are characterised by the dependent claims 2-5.

The second phase with more or less supply of flushing water or diluting water is preferably activated when the first phase has regulated the emptying level up to a predetermined number of times.

The amount of more or less finished slurry which is emptied and the amount of more or less flushing water or diluting water which is added can be regulated dependent on the capacity of the slaker.

In a slaker with a capacity of 4000 kg, at a water temperature between 0-10° C., the temperature can be regulated in the first phase in that 50 kg more of the finished slurry is emptied out if a lower temperature limit of 79° C. is not achieved, and if the temperature during slaking goes above an upper temperature limit of 86° C., 50 kg less of the finished slurry can be emptied out.

In a slaker with a capacity of 4000 kg and water temperatures between 10-20° C., the temperature can be regulated in the second phase in that 50 kg more of the flushing water or diluting water is added if a lower temperature limit of 79° C. is not reached, and if the temperature during slaking goes above an upper temperature limit of 86° C., 50 kg less of flushing water or diluting water can be added.

The invention shall be described with the help of the enclosed FIGURE that shows an embodiment example of a lime slaker device.

By carrying out the method according to the invention for batchwise warm-slaking of burnt lime, a lime slaker device is used as shown and described in detail in said NO patent application 19933084, to which reference is made.

It shall be pointed out that values for given weights, volumes, temperatures, times, etc., are given as examples, and said values must therefore not be regarded as absolute.

An example of a lime slaking device, which is shown schematically in FIG. 1, comprises of, in the main, a lime slaker 2 with a cylindrical top part 53 and a conical lower part 54 fitted on three load cells 7 for batchwise weighing of water and lime and with a stirrer 16 with a specially constructed mixing body and drive motor 18, rotation monitor 20 and also a water-jet driven combined dust suction/weir appliance/baffle 15 that is supplied water through a pipeline with a valve 17, where the slaker 2 receives water through a pipeline with valves 8 and 9. The slaker lid 4 is connected to a specially constructed water-outflow-preventing valve that also separates the wet and the dry lime zones. The slaker is connected to a lime silo 1 with a level gauge and also a filter 52 with a drive motor 51 for mechanical cleaning. The silo can hold 80 tonnes of burnt lime, for example, of volumetric weight 1.1 (weight scale range 0-90 tonnes), and is equipped with load cells to read the weight. The load cells' amplifier gives out a 4-20 mA signal to a PLS. The silo can also be fitted with three air activators that are started and follow a given cycle if the dosing time for the screw transporter is exceeded.

The silo is filled with lime through the inlet pipe from, for example, a road tanker.

The weight of the amount in the silo is displayed from a cabinet at the silo filling location. When 95% of the weight (AH) has been reached, an alarm in the form of a sound/light signal is given as a warning that the filling must be stopped. The sound alarm can be set from the cabinet and/or automatically by the PLS, for example, after three minutes. At 100% weight (AHH), a filling valve is automatically shut and the feeding of lime is stopped. While the valve is shut, a red warning lamp in the cabinet indicates that the filling of the silo can not take place. The filling valve can be controlled manually from the panel in the control centre.

Load cells fitted on the silo emit an alarm signal and a trip signal:
  at ≥AH Alarm. The operator is warned about a high level in the silo.
  at ≥AHH Warns the operator and shuts the inlet valve.
  at ≤ALZ Alarm. Low level in the silo.

The filter motor is preferably fitted with a safety switch and a service reverser (automatic/manual).

After the filling of lime in the silo has been completed, the filter motor 51 is started manually from a local cabinet. A signal is emitted from the cabinet to an outer PLS that starts the filter motor and monitors the operational state of the motor. The filter motor 51 stops automatically after three minutes.

EXAMPLE

1. Start button in a local cabinet is activated
2. Filter motor 51 starts and the operation light in the cabinet lights up
3. The filter motor stops after about three minutes Lime is transferred with the screw transporter 6 from the silo 1 to the slaker 2 with the valves 11 and 12 open. The slaking is initiated in that the first batch is slaked manually. The addition of lime is thereafter automatic, whereby the slaker 2 is filled with a predetermined amount of diluting water. The slaker is thereafter emptied to a predetermined residual amount, into which the next batch of lime is to be slaked.

The lime slaking temperature is decided by the ratio between residual number of kilos diluted lime slurry in the slaker (EVL) and the number of kilos of added lime (EVH), or the chosen set-points on the load cells 7, i.e. the set-points on the scale one chooses. The concentration of fully slaked lime is determined finally by the number of kilos of water that is chosen at the last set-point (EVHH). The number of kilos of water that is chosen at the last set-point (EVHH) is determining for the concentration of fully slaked lime.

The load cells 7 generate five working contacts for use in sequence:
  at ≥EVHHH Filling of water to the upper level.
  at ≥EVHH Reached amount of filled flushing water.
  at ≥EVH Reached amount of added lime.
  at ≥EVL New slaking level confirmed before new slaking.
  at ≥EVLL Stirring is stopped.

Fully slaked lime is sent to a storage tank 3 through the valve 22 with the help of a motor. The motor is preferably fitted with a safety switch and a service reverser.

The subsequent first example shows a slaker with an operating volume of, for example, 2100 liters (weight scale area 0-2500 kg). At the start, the slaker 2 is manually filled with 400 liters of water, followed by 120 kg lime under stirring. When the mixture has reached a stable temperature of about 80° C., registered by a temperature measuring element, automatic operation can start and water is added to a mixture weight of 1200 kg, which gives a 10% slurry with a temperature of about 30° C.

The slaker can now be emptied to a remaining weight of, for example, 600 kg. This is followed by a break of 30 seconds for return from, for example, the pump. It is important that the control system can register the real value of the batch and is tared to 0 kg, which is necessary because inertia in the system can lead to a risk of more or less chemicals than predetermined being added to the slaker.

With automatic control, when the weight in the slaker 2 is 600 kg or a newly calculated value based on the temperature regulation and after a pause of 30 seconds has expired, the slaking process will start if it is not already underway and the valve 22 will be closed.

The valve 12 in the slaker lid receives an opening signal and is confirmed in an open position from limit switches, the opening signal is sent over to the valve 17, and a dust suction unit 15 is started. After five seconds time delay the valve 11 is opened at the outflow end of the screw transporter 6 and is confirmed as open from a limit switch. A rotation monitor controls that the stirring has begun and an alarm is given if this is not the case or if the valve is not open after the command. If stirring stops, the valve 9 is opened and the slaker is completely filled with water and the process is interrupted.

The screw transporter 6 is started five seconds after a limit switch has confirmed that valve 11 is in an open position, and initiates the timer for normal dosing time, for example, 180 seconds. The correct dosing time is set at start up of the plant. If the time is exceeded by 100% (360 seconds in this example), the air stimulator will be opened and closed in a determined cycle (open for about 0.5 seconds for every 30 seconds) with a start in the pause part and limited to 180 seconds. If the predetermined weight in the mixer is still not achieved the cycle will be interrupted because the storage tank signals a low level and an alarm is given.

The screw transporter 6 is kept going until the required lime amount (120 kg) has been weighed-in. One second after the transporter has stopped the valve 11 is closed. Ten seconds after the valve is confirmed as closed, a solenoid valve is opened for three seconds for air to the outflow vibrator. The valve 12 is closed for 20 seconds after the valve 11 is confirmed as closed, and a limit switch controls that the valve is closed. When the valve has closed, the weight is recalibrated to 0 kg. An alarm is sounded if the valve is not closed after the command.

For immediate cleaning of the slaker 2 before the next slaking, after said taring of the load cell installation 7, a number of valves can be opened for a fixed period of time for supply of flushing water to the respective nozzles, in that the flushing water is supplied sequentially via each valve to associated nozzles(s) until a predetermined amount of flushing water is reached in the slaker 2. For example, five seconds after the valve in the slaker 2 has signalled closed and after the finished slaking, the first valve 25 is opened for flushing water with a nozzle for ten seconds, after which the first valve 25 is closed and the second valve 26 is opened for flushing water with three nozzles for eight seconds, after which the second valve 26 is closed and the third valve 27 is opened for flushing water with three nozzles on the opposite side of the slaker 2, until a total predetermined amount of flushing water has been weighed into the slaker. Flushing water is supplied until the total amount of flushing water weighed in is, for example, 20 kg.

As shown in the FIGURE, the first valve 25 controls the delivery of water to one or more nozzles via a pipe 28, while the second valve controls delivery of water to one or more nozzles via a pipeline 29, and the third valve 27 controls delivery of water to one or more nozzles via a pipeline 30. Preferably, nozzles are placed on opposite sides in the slaker, for example, the nozzles can be placed in one half of the circumference or the whole of the circumference of the slaker, for example, with the same or different mutual spacing.

20 seconds after valve 12 is closed, the closing signal is given to valve 17 and the dust suction 15 is stopped. After the screw transporter is stopped, adjustable slaking time is begun, for example, ten minutes. The chosen slaking time and the course of this should be indicated to the operator.

When the slaking time is finished, water is supplied through valve 8 and through the flushing nozzles 24 for 15 seconds. Thereafter 1180 kg of diluting water (calculated from the second 0-taring which has already added 20 kg of water) is supplied through valve 9, which gives a 10% lime slurry at a temperature of 30° C. With an error in amount of lime added above +2% the amount of diluting water is adjusted.

The temperature in the slaker is monitored by a temperature measuring element. If a temperature of 83° C. is not reached during the slaking process, 15 kg more of the finished slurry is emptied out, whereby EVLL reduces to 485 kg or conversely if the temperature is too high (88° C.) to 515 kg.

If the temperature during the slaking process rises above 96° C., the valve 8 is also opened, or other valves, the slaker is filled with water until full level EVHHH, the process is interrupted and an alarm is given, without the stirring being stopped.

As previously described, for preparation of a 10% lime slurry it is required to add 60 kg of lime and 600 kg of water. The total level will vary depending on the temperature regulation. The finished concentration of the lime slurry is determining for the temperature of the slurry into which the lime is added for the next slaking. If a lime slurry with a higher concentration is wanted, the slaking should take place at a higher initial temperature. If a lower concentration is required at, for example, the point of use, the slurry should be diluted outside the slaker, for example, by proportional dosing between water and lime solution in the pipeline after the storage tank. Addition of water can be regulated with a flow meter and a control valve. Alternatively, measured amounts of water can be added in the storage tank at the same time as the slaker, from full weight in smaller batches, for example, four, adds proportional lime slurry amounts in the storage tank.

After completed slaking time the level in the storage tank is controlled, and when this is reduced to EVLL, valve 22 is opened and the batch is emptied into the storage tank.

In a second example a slaker with a capacity of, for example, 4000 kg is used. It shall be described in connection with such a slaker how the temperature control can be carried out in several phases depending on the inlet water temperature. The finished amounts of more or less of the finished slurry which is emptied out of the slaker and the amount of more or less of the flushing water or diluting water which is added to the slaker will thus be regulated dependent on the capacity of the slaker.

At water temperatures between 0-10° C. the temperature can be regulated in that a pre-determined amount more of the finished slurry is emptied out if a lower temperature limit is not reached, and if the temperature during slaking goes above an upper temperature limit a pre-determined smaller amount of the finished slurry is emptied out. In a slaker 2 with capacity of 4000 kg, 50 kg more of the finished slurry can be emptied out if a lower temperature limit of 79° C. is not reached, and if the temperature during slaking goes above an upper temperature limit of 86° C., 50 kg less of the finished slurry can be emptied out.

At water temperatures between 10-20° C. the temperature is regulated in that more of a pre-determined amount of flushing water or diluting water is supplied if the lower temperature limit is not reached, and if the temperature during slaking goes above an upper temperature limit less of a pre-determined amount of flushing water or diluting water is supplied. Correspondingly in a slaker 2 with capacity of 4000 kg the temperature is regulated in the second phase in that 50 kg more of flushing water or diluting water is supplied if the lower temperature limit of 79° C. is not reached, and if the temperature during slaking goes above an upper temperature limit of 86° C., 50 kg less flushing water or diluting water is added.

The second phase with more or less added flushing water or diluting water is activated, for example, when the first phase has regulated the emptying level up a pre-determined number of times, such as EVL five times up.

Correspondingly, as explained in the first example, if the temperature in phase one or phase two sometimes goes above 96° C. in the course of the process, the valves are opened and the slaker is filled with water to (EVHHH) the full level and the process is stopped with the subsequent equipment alarm. The stirrer must not be stopped.

Finished lime slurry is temporarily stored in the storage tanks 3 which are equipped with a level measure in the form of a pressure transmitter and also stirrer(s). The tank can generate signals for regulation of the slaking sequence. The level signal generates two working contacts for use in the sequence and also two signals for an alarm at low and high level, respectively, and a signal for starting of pumps.
    at ≥EVL: Slaking can be initiated.
    at ≥EVLL: Signal for receipt of a new batch from slaker.
    at ≥AHH: Alarm, for high level. Valve is closed.
    at ≥AL: Alarm, for low level.
    at ≥ALL: Alarm, very low level. Pumping out from storage tank 3 is stopped.

The stirrer shall operate continuously and is monitored by PLS. An alarm is given in addition to stop.

For the dosing of the slurry, one or more pumps are used. The pumps are arranged "standby" for each other and can be reset manually. Sealing water is added to the packing boxes of the pumps through solenoid valves, which have inbuilt flow switches for discharge of water if the sealing water does not appear for more than three minutes after start, an alarm is given and the pumps stop. The same will happen if sealing water is absent for three minutes during operation. Additionally, each pump is equipped with a flow detector and a pressure sensor which is fitted in the pipe on the pressure side of the pumps. If these do not register an amount of water and pressure after 15 seconds, an alarm is given. If the amount of water and the pressure are absent for a further 15 seconds, the pumps stop. A flow meter is used to measure the amount of slurry from the storage tank to the sand filter. This measuring unit sends a 4-20 mA signal back to the frequency converter(s). Sediment is emptied from the storage tank through a manually operated bottom valve.

In the two examples given above that describe slakers with a capacity of 2100 kg and 4000 kg, respectively, the normal slaking range lies between 75° C. and 90° C. Therefore the given temperatures must not be regarded as absolute, but be regarded as examples so that for slakers in the embodiment examples and other slakers with a different capacity, the temperatures can vary according to the circumstances.

The invention claimed is:

1. Method for batchwise slaking of burnt lime in a slaker, in which a lime slurry is produced, wherein the method comprises the following processing steps:
    after slaking burnt lime in a slaker, emptying the resulting finished lime slurry from the slaker until there is a pre-determined residual amount of the finished lime slurry remaining in the slaker, which residual finished lime slurry is used for mixing with additional water and burnt lime to form a next batch;
    automatically registering of the weight of the residual amount of the finished lime slurry in the slaker and subsequently calibrating a load cell to 0 kg;

automatically initiating a control system for automatic operation, which control system operates to add diluting water and burnt lime to the partially emptied slaker to form the next batch; and automatically regulating the slaking temperature in the next batch by adjusting the ratio between water and lime in the next batch if a predetermined minimum slaking temperature was not reached during slaking of the previous batch or if a predetermined maximum slaking temperature was exceeded during slaking of the previous batch and by automatically completely filling the slaker with water to stop slaking if a predetermined maximum temperature is exceeded, wherein the regulating of the slaking temperature is dependent on the temperature of incoming water that is added to the slaker to form the next batch, which incoming water is between 0-10° C. or is between 10-20° C., in which if the temperature of the incoming water is between 0-10° C., the slaking temperature of the next batch is regulated in that (a) if a predetermined minimum slaking temperature was not reached during slaking of the previous batch, the amount of the finished lime slurry that is emptied out of the slaker before forming the next batch is increased to be a predetermined amount more than the amount of the finished slurry that was emptied out of the slaker before forming the previous batch, and (b) if a predetermined maximum slaking temperature was exceeded during slaking of the previous batch, the amount of the finished lime slurry that is emptied out of the slaker before forming the next batch is reduced to be a predetermined amount less than the amount of the finished slurry that was emptied out of the slaker before forming the previous batch, and if the temperature of the incoming water is between 10-20° C., the slaking temperature of the next batch is regulated in that (a) if the predetermined minimum slaking temperature was not reached during slaking of the previous batch, the amount of diluting water that is added to the slaker to form the next batch is increased to be a predetermined amount more than the amount of diluting water that was added to the slaker to form the previous batch, and (b) if the predetermined maximum slaking temperature was exceeded during slaking of the previous batch, the amount of diluting water that is added to the slaker to form the next batch is reduced to be a predetermined amount less than the amount of diluting water that was added to the slaker to form the previous batch.

2. Method according to claim 1, wherein multiple batches are formed sequentially in two phases, including a first phase wherein batches are formed by incoming water at a temperature between 0-10° C. and a second phase wherein batches are formed by incoming water at a temperature between 10-20° C., the second phase being activated when the first phase has regulated the emptying of the slaker a predetermined number of times.

3. Method according to claim 1, wherein the amount of finished slurry which is emptied and the amount of diluting water which is added, is regulated depending on the capacity of the slaker.

4. Method according to claim 3, wherein:
the capacity of the slaker is 4000 kg;
the temperature of the incoming water is between 0-10° C.; and
(a) if a predetermined minimum slaking temperature of 79° C. was not reached during slaking of the previous batch, the amount of the finished lime slurry that is emptied out of the slaker before forming the next batch is increased to be 50 kg more than the amount of the finished slurry that was emptied out of the slaker before forming the previous batch, and (b) if a predetermined maximum slaking temperature of 86° C. was exceeded during slaking of the previous batch, the amount of the finished lime slurry that is emptied out of the slaker before forming the next batch is reduced to be 50 kg less than the amount of the finished slurry that was emptied out of the slaker before forming the previous batch.

5. Method according to claim 3, wherein:
the capacity of the slaker is 4000 kg;
the temperature of the incoming water is between 10-20° C.; and
(a) if a predetermined minimum slaking temperature of 79° C. was not reached during slaking of the previous batch, the amount of diluting water that is added to the slaker to form the next batch is increased to be 50 kg more than the amount of diluting water that was added to the slaker to form the previous batch, and (b) if a predetermined maximum slaking temperature of 86° C. was exceeded during slaking of the previous batch, the amount of diluting water that is added to the slaker to form the next batch is reduced to be 50 kg less than the amount of diluting water that was added to the slaker to form the previous batch.

* * * * *